(12) United States Patent
Yagura et al.

(10) Patent No.: US 10,655,590 B2
(45) Date of Patent: May 19, 2020

(54) VEHICLE

(71) Applicant: MITSUBISHI JIDOSHA KOGYO KABUSHIKI KAISHA, Tokyo (JP)

(72) Inventors: Hirofumi Yagura, Tokyo (JP); Yuichi Kamei, Tokyo (JP); Yasuo Kamimura, Tokyo (JP); Shuhei Yoshida, Tokyo (JP); Makoto Kamachi, Tokyo (JP); Hirotaka Sugimoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 236 days.

(21) Appl. No.: 15/814,827

(22) Filed: Nov. 16, 2017

(65) Prior Publication Data
US 2018/0135585 A1  May 17, 2018

(30) Foreign Application Priority Data
Nov. 17, 2016  (JP) ................................ 2016-224016

(51) Int. Cl.
*F02N 11/10*  (2006.01)
*B60K 15/05*  (2006.01)
(Continued)

(52) U.S. Cl.
CPC ............ *F02N 11/101* (2013.01); *B60K 15/05* (2013.01); *B60K 28/10* (2013.01); *B60L 3/0046* (2013.01);
(Continued)

(58) Field of Classification Search
CPC ............ B60K 15/05; B60K 2015/0546; B60K 28/10; B60L 15/2018; B60L 2250/16;
(Continued)

(56) References Cited

U.S. PATENT DOCUMENTS 8,122,984 B2 * 2/2012 Miwa ...................... B60L 53/12
180/65.27
2009/0057041 A1  3/2009 Kamaga
(Continued)

FOREIGN PATENT DOCUMENTS

EP  2 698 271 A1  2/2014
JP  2002-2428 A  1/2002
(Continued)

OTHER PUBLICATIONS

Miwa et al., JP5251783 B2: Open/Close notification device and vehicle (Year: 2013).*
(Continued)

*Primary Examiner* — John H Le
(74) *Attorney, Agent, or Firm* — Birch, Stewart, Kolasch & Birch, LLP

(57) ABSTRACT

A vehicle performs notification about an open/closed state of a lid member covering an interface for supplying driving energy. The vehicle includes a notification portion that performs notification when the lid member is in the open state and a connection detecting portion that detects a connection state of a driving energy supply device to the interface. In the vehicle, the notification portion suspends notification when the driving energy supply device is connected to the interface during the open state of the lid member.

4 Claims, 8 Drawing Sheets

(51) Int. Cl.
| | |
|---|---|
| *B60K 28/10* | (2006.01) |
| *F02N 11/08* | (2006.01) |
| *F02N 15/10* | (2006.01) |
| *B60L 15/20* | (2006.01) |
| *B60L 3/00* | (2019.01) |
| *H02P 6/28* | (2016.01) |
| *H02P 6/15* | (2016.01) |
| *H02P 27/08* | (2006.01) |
| *B60L 53/14* | (2019.01) |
| *B60L 53/24* | (2019.01) |
| *B60L 53/16* | (2019.01) |
| *B60L 53/22* | (2019.01) |
| *B60R 21/00* | (2006.01) |

(52) U.S. Cl.
CPC ........... *B60L 15/2018* (2013.01); *B60L 53/14* (2019.02); *B60L 53/16* (2019.02); *B60L 53/22* (2019.02); *B60L 53/24* (2019.02); *F02N 11/0803* (2013.01); *F02N 15/10* (2013.01); *H02P 6/15* (2016.02); *H02P 6/28* (2016.02); *H02P 27/08* (2013.01); *B60K 2015/0546* (2013.01); *B60L 2250/16* (2013.01); *B60L 2250/24* (2013.01); *B60L 2270/00* (2013.01); *B60R 21/00* (2013.01); *Y02T 10/644* (2013.01); *Y02T 10/645* (2013.01); *Y02T 10/7005* (2013.01); *Y02T 10/7072* (2013.01); *Y02T 10/72* (2013.01); *Y02T 10/7275* (2013.01); *Y02T 90/14* (2013.01)

(58) Field of Classification Search
CPC ............ B60L 2250/24; B60L 2270/00; B60L 3/0046; B60L 53/12; B60L 53/14; B60L 53/16; B60L 53/22; B60L 53/24; B60R 21/00; F02N 11/0803; F02N 11/101; F02N 15/10; H02P 27/08; H02P 6/15; H02P 6/28; Y02T 10/644
USPC ......................... 702/36, 96; 180/65.27, 65.21
See application file for complete search history.

(56) References Cited

U.S. PATENT DOCUMENTS

| | | |
|---|---|---|
| 2010/0066890 A1 | 3/2010 | Ueda et al. |
| 2010/0133024 A1* | 6/2010 | Miwa ..................... B60K 6/365 |
| | | 180/65.21 |
| 2014/0012444 A1 | 1/2014 | Wake et al. |
| 2014/0042966 A1 | 2/2014 | Masuda et al. |

FOREIGN PATENT DOCUMENTS

| | | |
|---|---|---|
| JP | 2014-066076 A | 4/2014 |
| JP | 2014-67300 A | 4/2014 |
| WO | WO 2012/140729 A1 | 10/2012 |

OTHER PUBLICATIONS

Office Action dated Mar. 15, 2019 issued in corresponding European Application No. 17 202 063.8.
Extended European Search Report dated Mar. 29, 2018 in the corresponding European Application No. 17202063.8.
Japanese Office Action of JP 2016-224016 with English translation dated Jan. 21, 2020.

* cited by examiner

VEHICLE

CROSS REFERENCE TO RELATED APPLICATION

This application is based on Japanese Patent Application No. 2016-224016 filed on Nov. 17, 2016, the contents of which are incorporated herein by reference.

BACKGROUND OF THE INVENTION

1. Technical Field

The present invention relates to a vehicle.

2. Background Art

According to the background art, there has been known a technique for preventing a vehicle from running while a lid member remains in an open state. The lid member serves for protecting an interface (e.g. a charging connector or an oil feeding port) which is provided in the vehicle in order to make connection with a driving energy supply device (e.g. a charger or an oil feeding machine). This is because the lid member may hit against the surroundings to be damaged when the vehicle runs while the lid member remains in the open state. In addition, this is also because mischief may be done on the interface or foreign matters may adhere to the interface when the lid member is open to expose the interface.

For example, JP-A-2002-2428 has disclosed an alarm device which notifies a user of a fact that an engine cannot be started up due to an open state of a filler lid in a car which has an erroneous start preventing function against the open state of the filler lid.

The aforementioned technique is effective in being capable of notifying the user of the fact that the lid member is in the open state when the user does not recognize the fact. However, the user may feel it inconvenient in such a case where the user has to run the vehicle while recognizing that the lid member is in the open state, for example, when the lid member is deformed too much to move to a position which can be recognized as a closed state, or when a mechanism for opening/closing the lid member does not function temporarily due to freezing etc. In addition, when such notification continues as a normal practice, it may become difficult for the user to notice the notification, thereby deteriorating effectiveness of the notification.

The invention has been accomplished in consideration of such circumstances. An object of the invention is to notify that a lid member covering an interface for supplying driving energy of a vehicle is in an open state at a proper timing to thereby improve effectiveness of the notification.

SUMMARY OF THE INVENTION

According to an aspect of the invention, a vehicle that performs notification about an open/closed state of a lid member covering an interface for supplying driving energy includes a notification portion that performs notification when the lid member is in the open state and a connection detecting portion that detects a connection state of a driving energy supply device to the interface. In the vehicle, the notification portion suspends notification when the driving energy supply device is connected to the interface during the open state of the lid member.

According to the above configuration, when the driving energy supply device is connected to the interface while the lid member covering the interface is in the open state, notification about the open state of the lid member is suspended. Thus, the notification which is likely to be unnecessary for the user is suspended so that annoyance to the user can be reduced. In addition, the notification is performed under more proper conditions so that effectiveness of the notification can be enhanced advantageously.

DETAILED DESCRIPTION OF EMBODIMENT

A preferred embodiment of a vehicle according to the invention will be described below in detail with reference to the accompanying drawings.

In the embodiment, the vehicle according to the invention is regarded as an electric vehicle 20. That is, it is assumed that the vehicle according to the invention uses electric power as driving energy of the vehicle and a driving energy supply device is an external charger 30.

Figure 1:
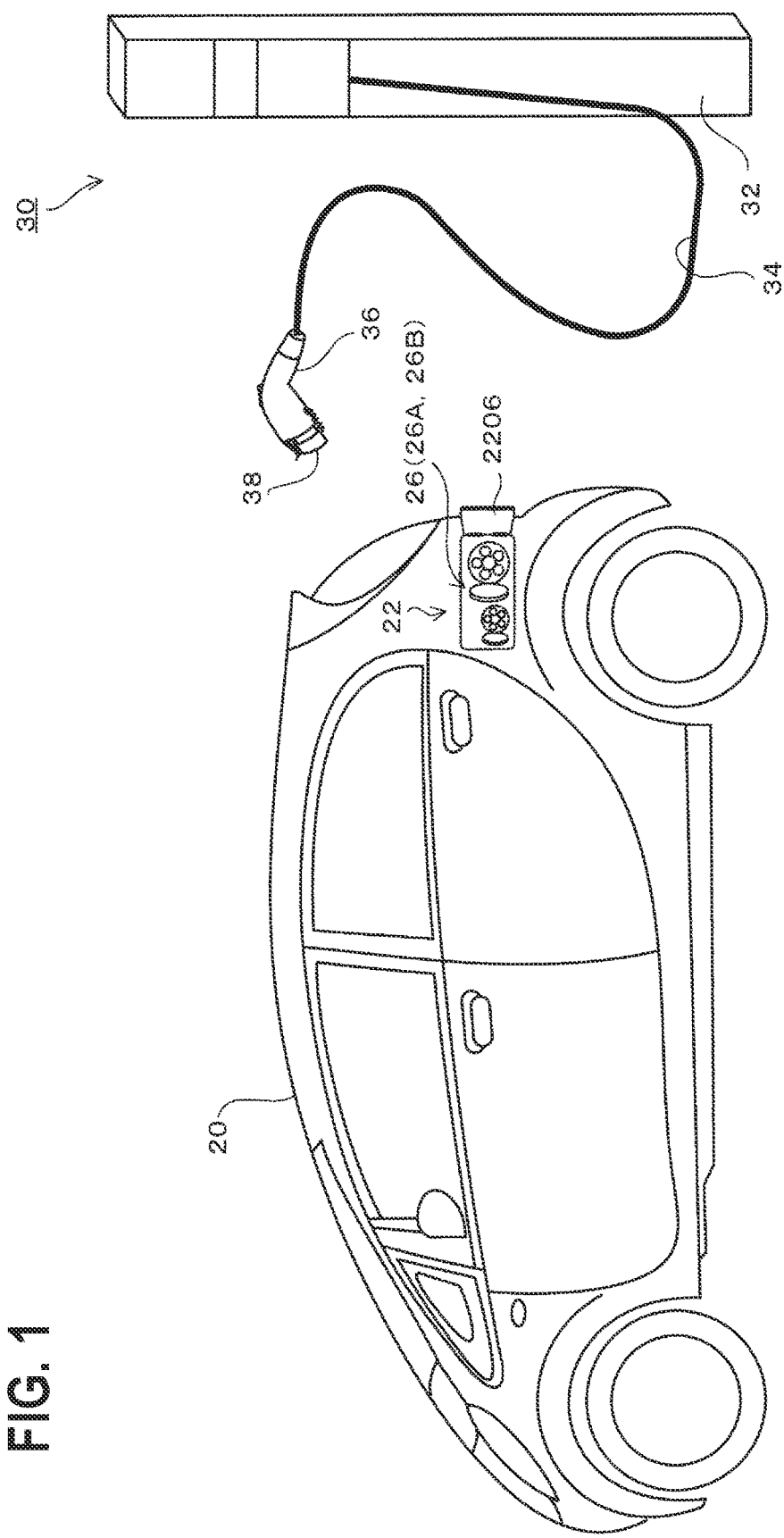
FIG. 1 is an explanatory view showing external appearance of an electric vehicle 20.

FIG. 1 is an explanatory view showing external appearance of the electric vehicle 20.

The electric vehicle 20 according to the embodiment has a driving battery which stores driving electric power of a driving motor of the vehicle. The electric vehicle 20 runs using electric power as at least a portion of the driving energy.

A charging port 22 is provided in an outer face of the electric vehicle 20. The charging port 22 is covered with an outer lid member 2206 (charging lid). The charging port 22 houses vehicle-side connectors 26 (26A, 26B) to one of which a charger-side connector 36 of the external charger 30 is connected for charging the electric vehicle 20. In the embodiment, the vehicle-side connectors 26 (26A, 26B) correspond to an interface for supplying driving energy, and the outer lid member 2206 corresponds to a lid member.

The external charger 30 corresponds to a driving energy supply device. The external charger 30 supplies electric power to the driving battery (not shown) mounted in the electric vehicle 20.

The external charger 30 is configured to include a body portion 32, a charging cable 34, and the charger-side connector 36. A control portion (charging controller) for controlling operation of the external charger 30, a user interface for displaying a charging state of the external charger 30, charging setting, an operation screen etc., etc. are provided in the body portion 32.

The charging cable 34 is extended from the body portion 32. The charger-side connector 36 is provided at a front end of the charging cable 34. A charger-side coupling face 38 to be connected to one of vehicle-side coupling faces 2602 (see FIG. 2) of the vehicle-side connectors 26 is provided at a front end of the charger-side connector 36. An electric power supply plug for supplying electric power to the electric vehicle 20 and a data plug for exchanging data with the electric vehicle 20 are provided in the charger-side coupling face 38.

Figure 2:
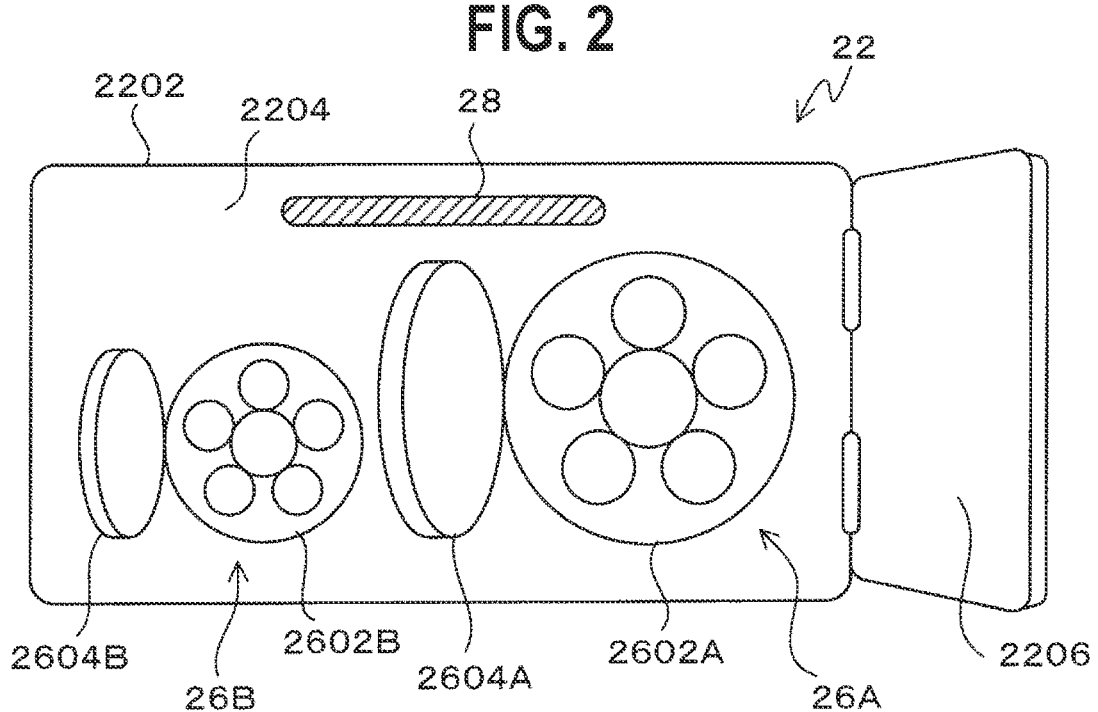
FIG. 2 is an enlarged view of a charging port 22 of the electric vehicle 20.

FIG. 2 is an enlarged view of the charging port 22 of the electric vehicle 20.

An opening portion 2202, a recess 2204, the outer lid member 2206, and the vehicle-side connectors 26 (26A, 26B) are provided in the charging port 22 of the electric vehicle 20. The opening portion 2202 is provided in the outer face of a vehicle body of the electric vehicle 20. The recess 2204 is sunken in an interior direction of the vehicle from the opening portion 2202. The outer lid member 2206 covers the opening portion 2202. The vehicle-side connectors 26 (26A, 26B) are provided inside the recess 2204 so that the charger-side connector 36 of the external charger 30 can be connected to one of the vehicle-side connectors 26 (26A, 26B).

In addition, an illumination device 28 is provided inside the charging port 22 so that visibility of the periphery of the charging port 22 can be secured and charging work can be performed easily even when lightness in the periphery of the vehicle at night etc. is low.

In the embodiment, two vehicle-side connectors 26A and 26B are provided inside the charging port 22. The two vehicle-side connectors 26A and 26B are a rapid charging connection portion 26A and a normal charging connection portion 26B respectively. The two vehicle-side connectors 26A and 26B can be chosen according to the kind of the external charger 30 to be used. The two vehicle-side connectors 26A and 26B are disposed side by side laterally. Therefore, both the opening portion 2202 and the outer lid member 2206 covering the opening portion 2202 are formed into an oblong rectangle. The outer lid member 2206 is higher in size than that in a case where only one connector is provided.

Each of the vehicle-side connectors 26 (26A, 26B) is provided with the vehicle-side coupling face 2602 (2602A, 2602B) and an inner lid member 2604 (2604A, 2604B) covering the vehicle-side coupling face 2602. A plug receptacle corresponding to various plugs provided in the charger-side coupling face 38 of the charger-side connector 36 is provided in the vehicle-side coupling face 2602. During charging of the electric vehicle 20, the outer lid member 2206 and one of the inner lid members 2604 are opened, the charger-side connector 36 is inserted into the charging port 22, and the charger-side coupling face 38 of the charger-side connector 36 and the vehicle-side coupling face 2602 of the corresponding vehicle-side connector 26 are connected to each other so that electric power can be transmitted/received therebetween.

Figure 3:
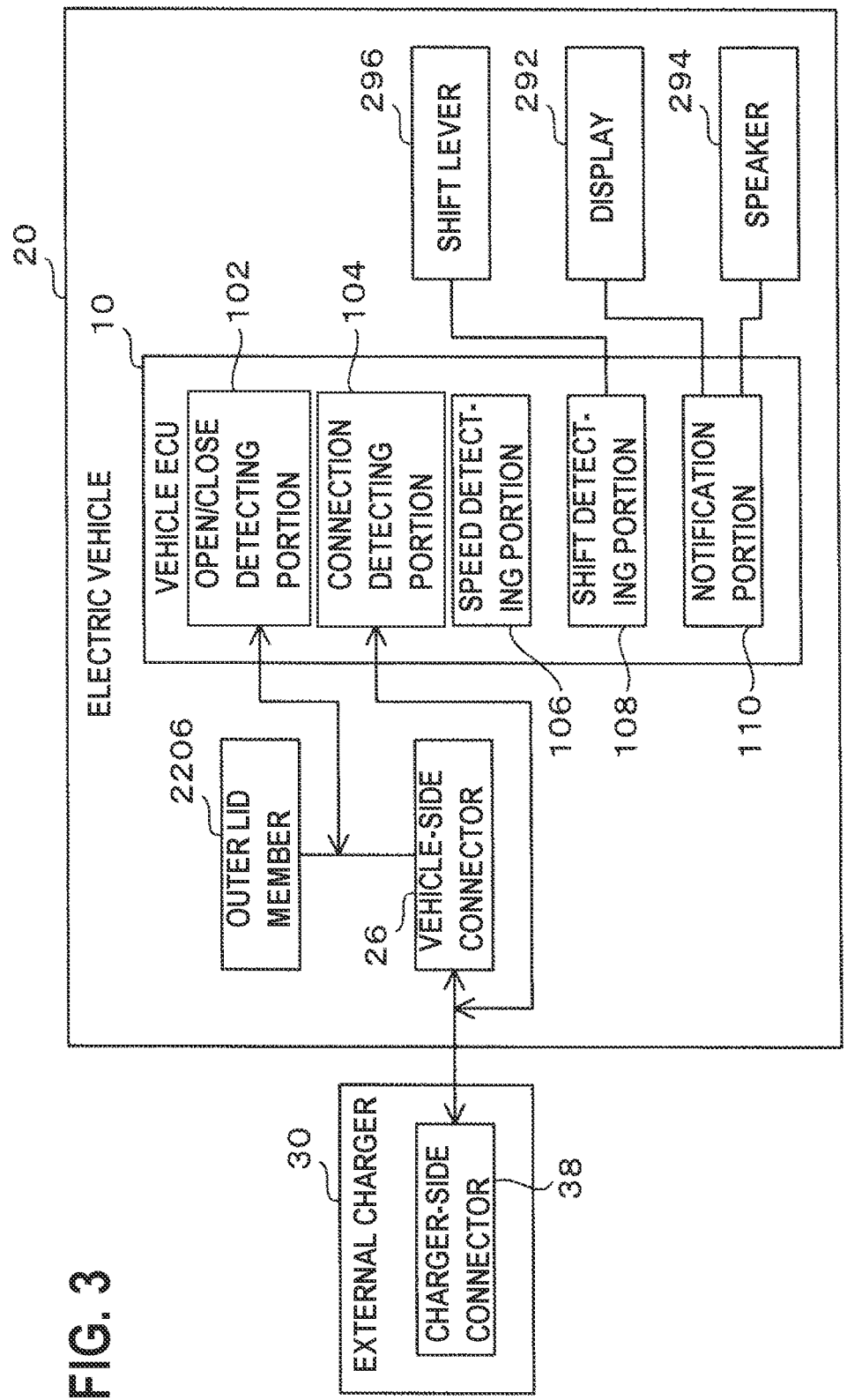
FIG. 3 is a block diagram showing a functional configuration of the electric vehicle 20.

FIG. 3 is a block diagram showing a functional configuration of the electric vehicle 20.

The electric vehicle 20 has a function of performing notification about an open/closed state of the outer lid member 2206 covering the vehicle-side connectors 26 mainly by processing of a vehicle ECU 10. The vehicle-side connectors 26 serve as interfaces for supplying driving energy of the own vehicle.

The vehicle ECU 10 is constituted by a CPU, an ROM storing and saving a control program etc., an RAM serving as a working region of the control program, an EEPROM holding various data rewritably, an interface portion taking an interface with a peripheral circuit, etc.

When the CPU of the vehicle ECU 10 executes the control program, the vehicle ECU 10 functions as an opening/closing detecting portion 102, a connection detecting portion 104, a speed detecting portion 106, a shift detecting portion 108, and a notification portion 110.

The opening/closing detecting portion 102 detects an open/closed state of the outer lid member 2206. The opening/closing detecting portion 102 detects an operating state of a charging lid opener which opens the outer lid member 2206, for example, due to an operation of a driver, so that the opening/closing detecting portion 102 can detect whether the outer lid member 2206 is in an open state or a closed state. In addition, for example, a proximity sensor may be provided in the opening portion 2202 or the outer lid member 2206 of the charging port 22 to thereby detect whether the outer lid member 2206 is in an open state or a closed state.

The connection detecting portion 104 detects a connection state of the external charger 30 (driving energy supply device) to one of the vehicle-side connectors 26 which is an interface for supplying driving energy. For example, the connection detecting portion 104 monitors a data communication status between the electric vehicle 20 and the external charger 30 to thereby detect whether the external charger 30 (charger-side connector 36) is connected to the vehicle-side connector 26 or not. In addition, for example, a proximity sensor may be provided at the vehicle-side coupling face 2602 of the vehicle-side connector 26 i.e. a contact point between the vehicle-side connector 26 and the external charger 30 to thereby detect a connection status of the external charger 30 to the vehicle-side connector 26.

The speed detecting portion 106 detects a running speed of the electric vehicle 20. For example, the speed detecting portion 106 acquires detection values of wheel speed sensors provided at respective wheels of the electric vehicle 20 to thereby calculate an average value of the detection values of the wheel speed sensors as the running speed of the electric vehicle 20.

The shift detecting portion 108 detects an operating state on a shift lever 296 which serves as a shift setting portion of the electric vehicle 20. For example, the shift detecting portion 108 is a sensor for detecting the position of the shift lever 296. The shift detecting portion 108 detects whether the operating state of the shift lever 296 is a shift range (such as a D range, a B range or an R range) in which the electric vehicle 20 is enabled to run or a shift range (such as a P range or an N range) in which the electric vehicle 20 is disabled from running.

The notification portion 110 performs notification when the outer lid member 2206 is in an open state. That is, when it is detected by the opening/closing detecting portion 102 that the outer lid member 2206 is in the open state, the notification portion 110 notifies an occupant of the electric vehicle 20 of the detected fact.

For example, the notification portion 110 displays the fact that the outer lid member 2206 is in the open state on a display 292 provided on an interior of the electric vehicle 20. In this manner, the notification portion 110 performs notification visually.

Figure 4:
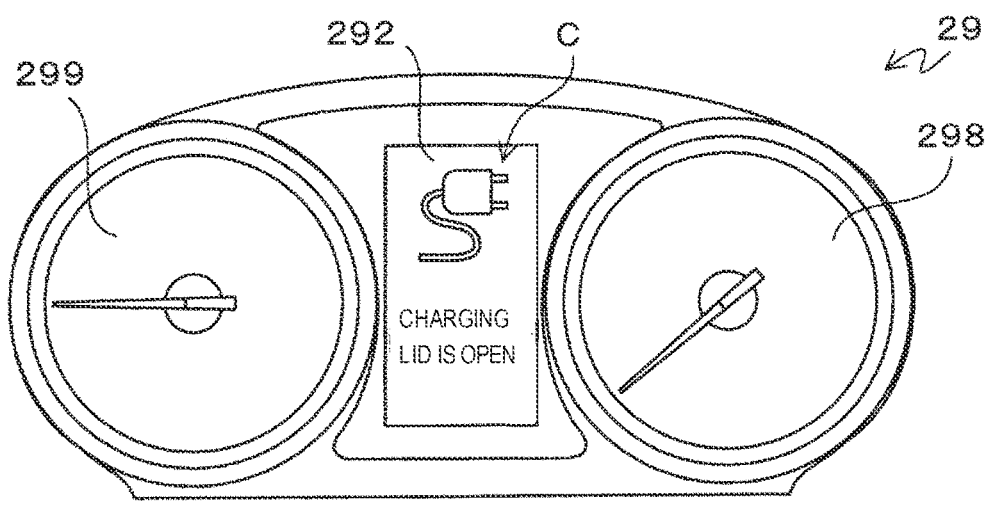
FIG. 4 is an explanatory view of an example of notification using a display 292.

FIG. 4 is an explanatory view of an example of the notification using the display 292.

For example, the display 292 is provided in an installment panel 29 which is provided to be opposed to a driver's seat. In the example of FIG. 4, a display C including an icon of an attachment plug and a message indicating that "charging lid (outer lid member 2206) is open" is performed on the display 292. In this manner, the fact that the outer lid member 2206 is in the open state is notified.

Incidentally, in addition to the display 292, a speedometer 298 and a power meter 299 are provided in the installment panel 29. The speedometer 298 displays the running speed of the electric vehicle 20. The power meter 299 displays an input/output status of electric power of the driving battery.

In addition, a warning lamp for indicating the fact that the outer lid member 2206 is in the open state may be provided in advance in place of the display 292. Thus, the warning lamp can be lit to perform notification.

In addition, in addition to the aforementioned notification performed visually, notification may be performed auditorily, for example, in such a manner that the fact that the outer lid member 2206 is in the open state is outputted by voice from a speaker 294 provided in the interior of the electric vehicle 20. Further, the fact that the outer lid member 2206 is in the open state may be notified, for example, by vibrating a steering wheel, the driver's seat, etc. of the electric vehicle 20.

Here, the notification portion 110 suspends the aforementioned notification when the external charger 30 is connected during the open state of the outer lid member 2206. That is, when it is detected by the connection detecting portion 104 that the external charger 30 is connected to the vehicle-side connector 26, the notification portion 110 does not perform the notification even during the open state of the outer lid member 2206.

The vehicle-side coupling face 2602 of the vehicle-side connector 26 is not exposed in a state in which the external charger 30 is connected to the vehicle-side connector 26. Therefore, there is a low possibility that mischief may be done on the vehicle-side connector 26. In addition, the electric vehicle 20 cannot run in the state in which the external charger 30 is connected to the vehicle-side connector 26. Therefore, there occurs no damage on the outer lid member 2206 or an ambient object due to collusion of the outer lid member 2206. Even if the notification portion 110 notifies that the outer lid member 2206 is in the open state in such a state, the driver is expected to ignore the notification. Accordingly, when the external charger 30 is connected during the open state of the outer lid member 2206, the notification portion 110 suspends the notification which is likely to be unnecessary for the user to thereby reduce annoyance to the user. As will be described later, the notification portion 110 performs the notification under more proper conditions to thereby enhance effectiveness of the notification.

Incidentally, the fact that the open state of the outer lid member 2206 is in the open state is notified when the charging has been completed and the connection between the vehicle-side connector 26 and the external charger 30 has been released. Accordingly, the user can be prompted to close the outer lid member 2206 before starting running the vehicle.

In addition, there is a case where the user has to run the vehicle while recognizing that the outer lid member 2206 is in the open state, for example, when the outer lid member 2206 is deformed too much to move to a position which can be recognized as the closed state, or when a mechanism for opening/closing the outer lid member 2206 does not function temporarily due to freezing etc. In this case, the user may feel annoyed to be notified of the fact that the outer lid member 2206 is in the open state.

Accordingly, the notification portion 110 may change a notification mode according to the running state of the electric vehicle 20.

Change patterns of the notification mode according to the running state of the electric vehicle 20 will be shown as follows. However, of the patterns 1 to 4, which processing to perform is determined, for example, based on setting from the user. In addition, without applying the following patterns 1 to 4, the notification portion 110 may always notify the user of the fact that the outer lid member 2206 is in the open state as long as the outer lid member 2206 is in the open state and connection between the vehicle-side connector 26 and the external charger 30 is released.

<Pattern 1> Suspend Notification as Soon as the Running Speed of the Vehicle Becomes Equal to or Higher than a Predetermined Speed.

According to the pattern 1, the notification portion 110 performs notification in a case where the outer lid member 2206 is in an open state and the vehicle-side connector 26 and the external charger 30 are not connected to each other. When the electric vehicle 20 starts running, the notification portion 110 continues the notification as long as the running speed is lower than the predetermined speed. However, as soon as the running speed becomes equal to or higher than the predetermined speed, the notification portion 110 suspends the notification.

According to the pattern 1, in a case where the user does not close the outer lid member 2206 in spite of the notification performed between before the vehicle starts running and immediately after the vehicle starts running (the speed is lower than the predetermined speed), it is determined that the open state is continued due to user's intention. Therefore, the notification portion 110 suspends the notification. In this manner, the notification portion 110 can suspend the notification which is likely to be unnecessary for the user so that annoyance to the user can be reduced. In addition, for example, the user who is overloaded with confirmation of an ambient situation around the start of the vehicle running is not aware of the notification. In such a case, the notification portion 110 which has suspended the notification resumes the notification as soon as the vehicle speed changes to a low speed, for example, due to waiting for a traffic light etc. In this manner, the user can notice the notification easily.

Incidentally, the predetermined speed may be set at an extremely low speed (e.g. a speed of 1 km per hour) etc. so that the notification portion 110 can suspend notification substantially when the vehicle starts running.

Figure 5:
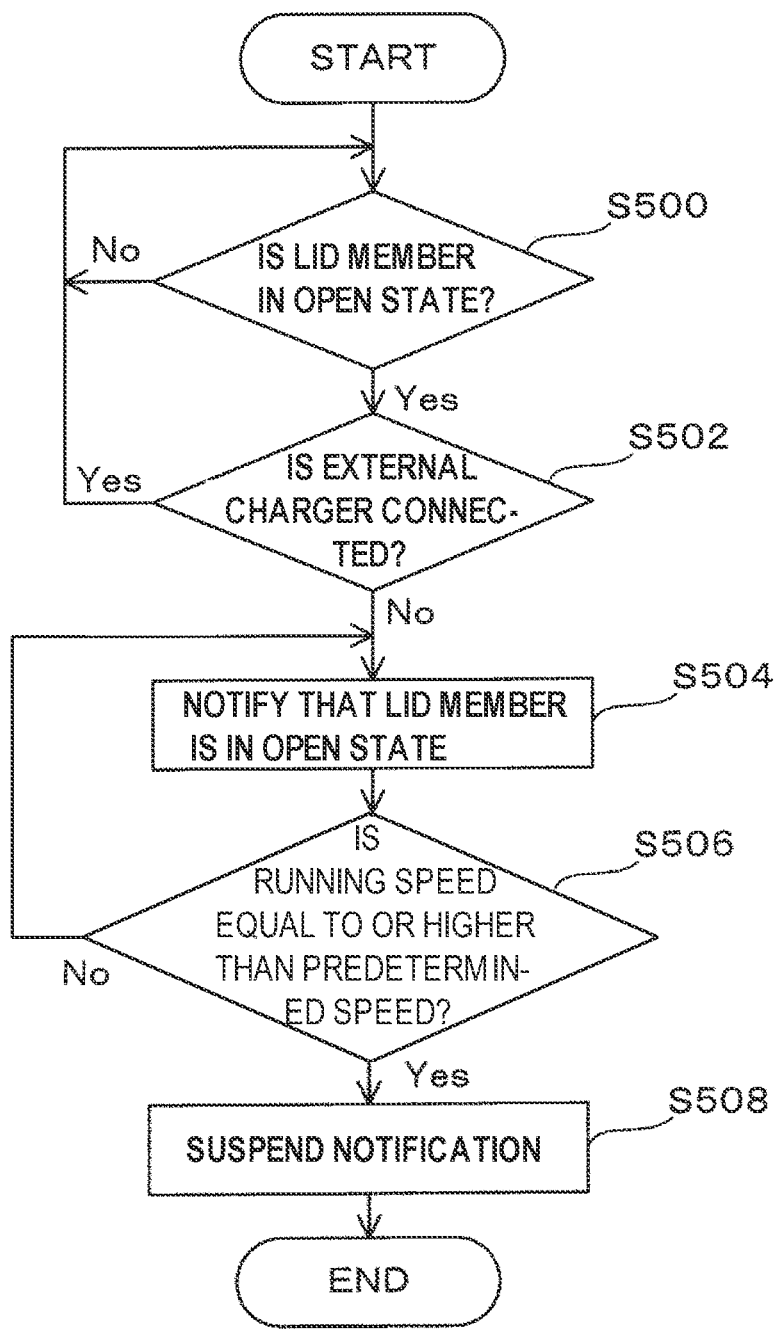
FIG. 5 is a flow chart showing processing of a pattern 1.

FIG. 5 is a flow chart showing processing of the pattern 1.

The vehicle ECU 10 detects an open/closed state of the outer lid member 2206 by the opening/closing detecting portion 102. When the outer lid member 2206 is in the open state (step S500: Yes), the vehicle ECU 10 detects a connection state of the external charger 30 to the vehicle-side connector 26 by the connection detecting portion 104. When the external charger 30 is connected to the vehicle-side connector 26 (step S502: Yes) or when the outer lid member 2206 is in the closed state in the step S500 (step S500: No), the vehicle ECU 10 returns to the step S500 without performing notification to repeat the processings in and after the step S500.

On the other hand, when the external charger 30 is not connected to the vehicle-side connector 26 in the step S502 (step S502: No), the notification portion 110 notifies that the outer lid member 2206 is in the open state (step S504).

Then, the electric vehicle 20 starts running. Unless the running speed becomes equal to or higher than a predetermined speed (loop for step S506: No), the notification portion 110 returns to the step S504 to continue the notification. When the running speed becomes equal to or higher than the predetermined speed (step S506: Yes), the notification portion 110 suspends the notification (step S508).

<Pattern 2> Change a Current Notification Method to Another Method as Soon as the Running Speed of the Vehicle Becomes Equal to or Higher than the Predetermined Speed.

According to the pattern 2, it is assumed that the notification portion 110 can perform notification by a plurality of notification methods such as display and voice. That is, when the outer lid member 2206 is in an open state and the vehicle-side connector 26 and the external charger 30 are not connected to each other, the notification portion 110 first starts notification by a first method (e.g. display on the display 292). When the electric vehicle 20 then starts running, the notification portion 110 continues the notification by the first method as long as the running speed is lower than the predetermined speed. As soon as the running speed becomes equal to or higher than the predetermined speed, the notification portion 110 changes over to notification by a second method (e.g. output of a voice message). On this occasion, the notification portion 110 may continue the notification by the first method in addition to the notification by the second method. In addition, at the timing when the running speed becomes equal to or higher than the predetermined speed, the notification portion 110 may perform the notification by the second method for a predetermined time and then suspend the notification as in the pattern 1.

According to the pattern 2, in a case where the user does not close the outer lid member 2206 in spite of the notification performed between before the vehicle starts running and immediately after the vehicle starts running (the speed is lower than the predetermined speed), it is determined that the contents of the notification are likely to be not transmitted to the user because the notification method is not suited to a user's situation. In some condition such as under backlight or during occurrence of smog, the user may pay much attention to the outside of the vehicle in order to confirm an ambient situation. Therefore, there is a possibility that the notification using display may be hardly transmitted to the user. In addition, in some condition such as during a large amount of rainfall or a large volume of ambient traffic or during use of a car stereo device, there is a possibility that the notification using voice may be hardly transmitted to the user. When the notification method is changed as in the pattern 2, the contents of the notification can be transmitted to the user easily.

Incidentally, the predetermined speed may be set at an extremely low speed (e.g. a speed of 1 km per hour) etc. so that the notification method can be changed to another substantially when the vehicle starts running.

Figure 6:
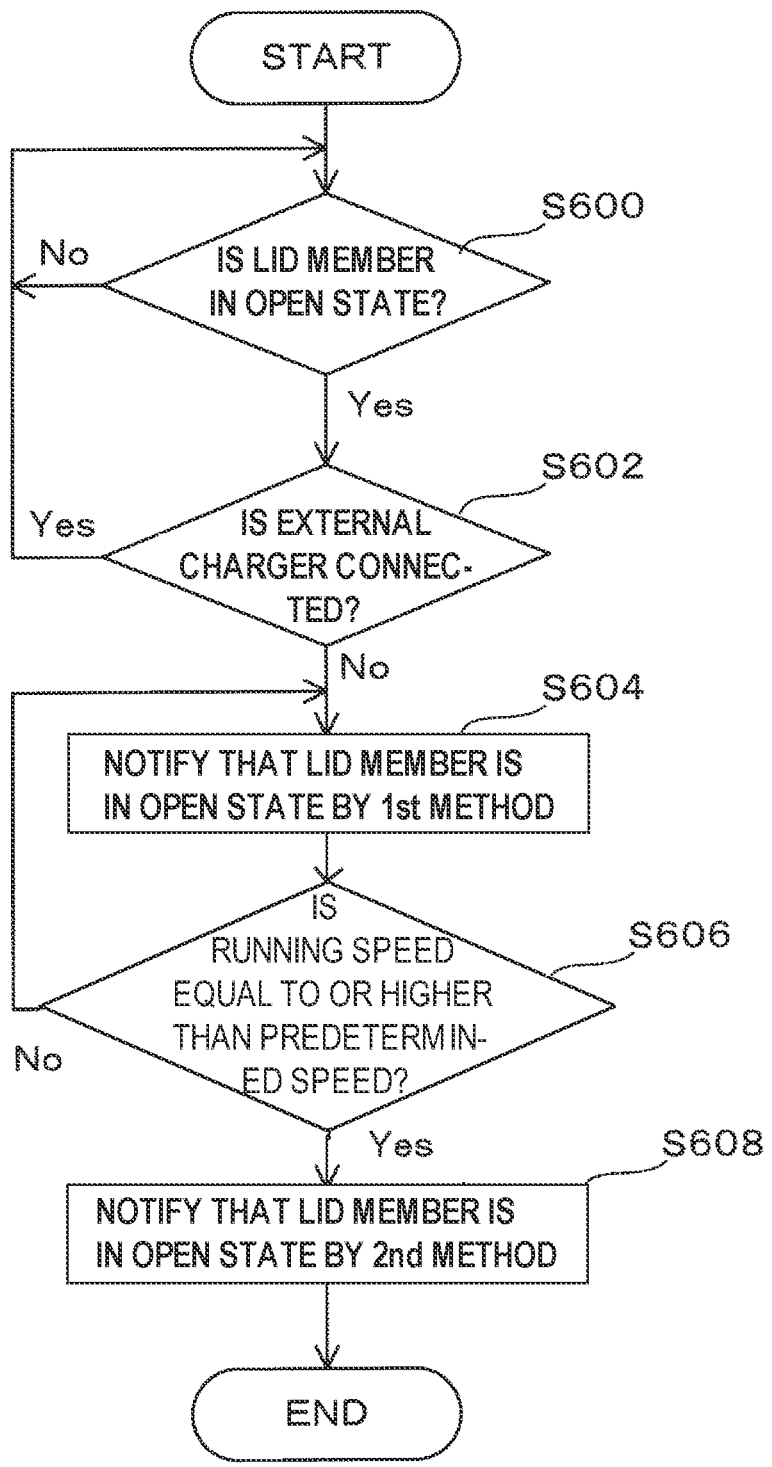
FIG. 6 is a flow chart showing processing of a pattern 2.

FIG. 6 is a flow chart showing processing of the pattern 2.

Steps S600 and S602 are the same as the steps S500 and S502 in FIG. 5.

Therefore, description about the steps S600 and S602 will be omitted.

When the outer lid member 2206 is in an open state (step S600: Yes) and the external charger 300 is not connected to the vehicle-side connector 26 (step S602: No), the notification portion 110 first notifies that the outer lid member 2206 is in the open state by a first method (such as display) (step S604).

Then, the electric vehicle 20 starts running. Unless the running speed of the electric vehicle 20 becomes equal to or higher than a predetermined speed (loop for step S606: No), the notification portion 110 returns to the step S604 to continue the notification by the first method. As soon as the running speed becomes equal to or higher than the predetermined speed (step S606: Yes), the notification portion 110 notifies that the outer lid member 2206 is in the open state by a second method (such as voice) (step S608).

<Pattern 3> Suspend Notification Once when the Vehicle Starts Running, and Resume the Notification as Soon as the Running Speed of the Vehicle Becomes Equal to or Higher than a Predetermined Speed.

According to the pattern 3, when the outer lid member 2206 is in an open state and the vehicle-side connector 26 and the external charger 30 are not connected to each other, the notification portion 110 performs notification. When the electric vehicle 20 starts running, the notification portion 110 suspends the notification once. As soon as the running speed becomes equal to or higher than the predetermined speed, the notification portion 110 resumes the notification.

According to the pattern 3, in a case where the user does not close the outer lid member 2206 in spite of the notification performed between before the vehicle starts running and when the vehicle starts running, it is determined that the open state is continued due to user's intention. Therefore, the notification portion 110 suspends the notification once when the vehicle running starts. Thus, the notification which is likely to be unnecessary for the user can be suspended so that annoyance to the user can be reduced. In consideration of a case where the user is not aware of the notification prior to the start of the vehicle running, the notification portion 110 resumes the notification before the running speed reaches a higher speed. In this manner, the user's intention can be reconfirmed. For example, the user who is overloaded with confirmation of an ambient situation prior to the start of the vehicle running is not aware of the notification. In such a case, the notification suspended once is resumed at a point of time when the running situation is conceived to be stable. In this manner, the user can notice the notification easily.

Incidentally, the timing of suspending the notification once may be set not at the timing when the vehicle starts running but at a timing when the running speed becomes equal to or higher than a first predetermined speed, and the timing of resuming the notification may be set at a timing when the running speed becomes equal to or higher than a second predetermined speed (> the first predetermined speed).

Figure 7:
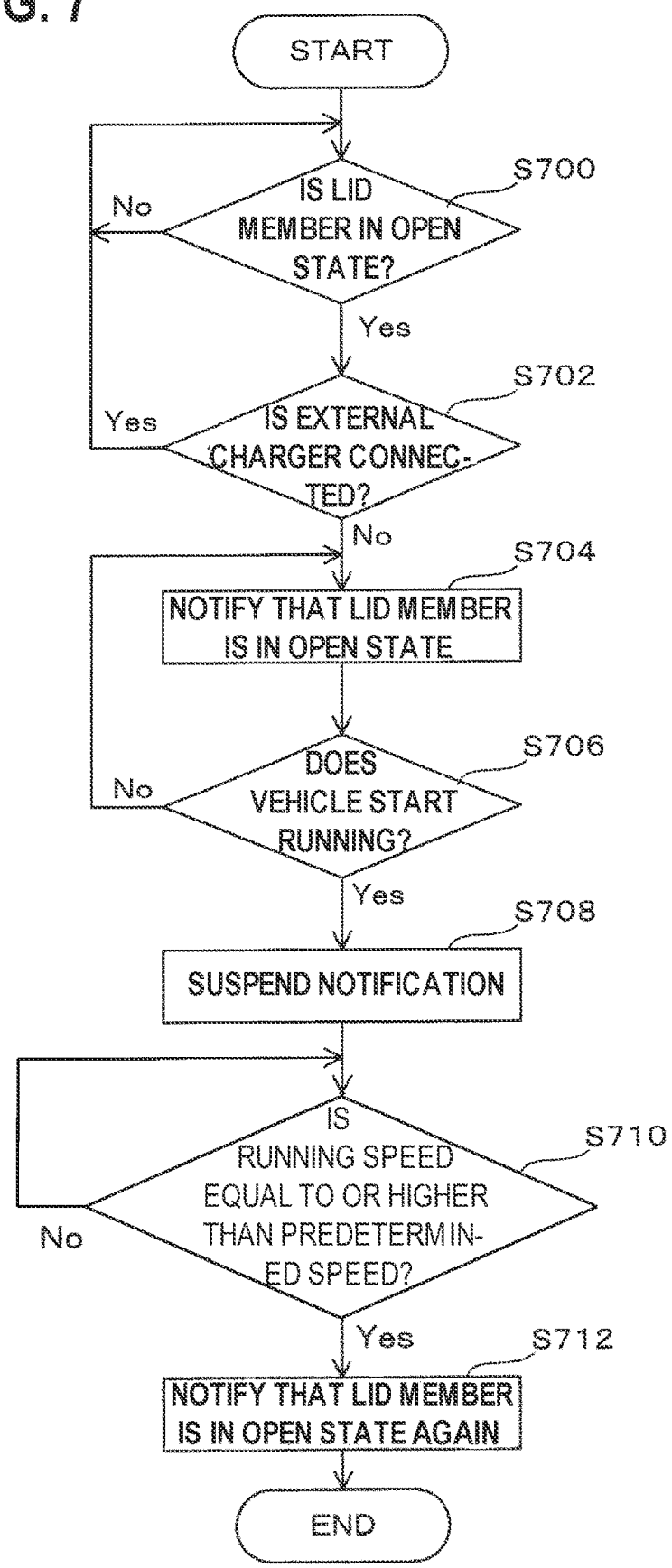
FIG. 7 is a flow chart showing processing of a pattern 3.

FIG. 7 is a flow chart showing processing of the pattern 3.

Steps S700 and S702 are the same as the steps S500 and S502 in FIG. 5.

Therefore, description about the steps S700 and S702 will be omitted.

When the outer lid member 2206 is in an open state (step S700: Yes) and the external charger 300 is not connected to the vehicle-side connector 26 (step S702: No), the notification portion 110 notifies that the outer lid member 2206 is in the open state (step S704).

Unless the electric vehicle 20 starts running (loop for step S706: No), the notification portion 110 returns to the step S704 to continue the notification. When the electric vehicle 20 starts running (step S706: Yes), the notification portion 110 suspends the notification (step S708).

Then, unless the running speed becomes equal to or higher than a predetermined speed (loop for step S710: No), the notification portion 110 continues the state in which the notification is suspended. As soon as the running speed becomes equal to or higher than the predetermined speed (step S710: Yes), the notification portion 110 resumes the notification about the open state of the outer lid member 2206 (step S712).

<Pattern 4> Suspend Notification when the Shift Lever 296 is Operated to a Shift Range where the Vehicle is Enabled to Run.

According to the pattern 4, when the outer lid member 2206 is in an open state, the vehicle-side connector 26 and the external charger 30 are not connected to each other, and the shift range is set at a shift range such as a P range or an N range where the vehicle is disabled from running, the notification portion 110 performs notification. Incidentally, generally, while the vehicle-side connector 26 and the external charger 30 are connected to each other, the shift range is expected to be set at the shift range such as the P range or the N range where the vehicle is disabled from running. Therefore, notification is expected to be performed immediately after the connection between the vehicle-side connector 26 and the external charger 30 is released. When the shift lever 296 (shift setting portion) is then operated to a shift range such as a D range, a B range or an R range where the vehicle is enabled to run, the notification portion 110 suspends the notification.

According to the pattern 4, in a case where the user does not close the outer lid member 2206 in spite of the notification performed during stop of the vehicle (when the shift range is located at the P range or the N range), it is determined that the open state is continued due to user's intention. Therefore, the notification portion 110 suspends the notification when the user shows his/her intention to run the vehicle (in the case where the user makes operation to change the shift range to the D range, the B range, the R range, or the like). In this manner, the notification portion 110 can suspend the notification which is likely to be unnecessary for the user so that annoyance to the user can be reduced.

Incidentally, also in the pattern 4, after the notification is suspended, the notification may be resumed as soon as the running speed becomes equal to or higher than a predetermined speed, in the same manner as in the pattern 3.

Figure 8:
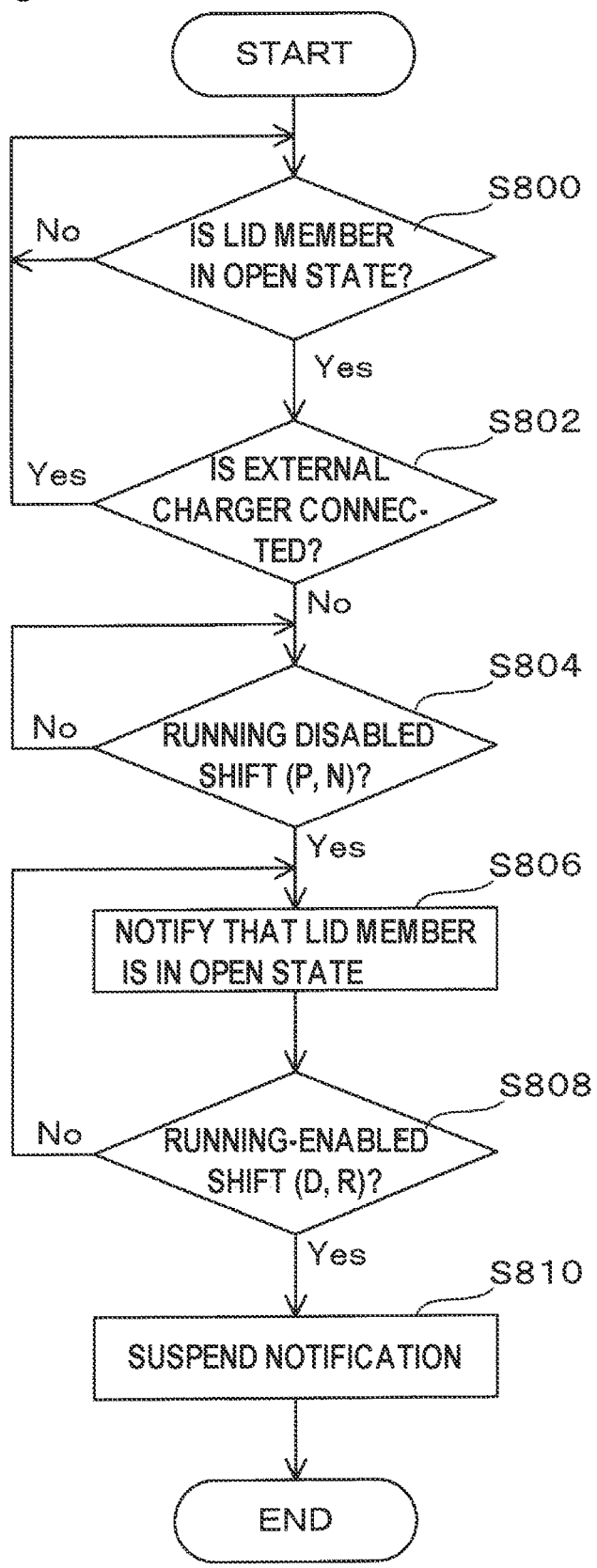
FIG. 8 is a flow chart showing processing of a pattern 4.

FIG. 8 is a flow chart showing processing of the pattern 4.

Steps S800 and S802 are the same as the steps S500 and S502 in FIG. 5.
Therefore, description about the steps S800 and S802 will be omitted.

When the outer lid member 2206 is in an open state (step S800: Yes) and the external charger 300 is not connected to the vehicle-side connector 26 (step S802: No), the notification portion 110 determines whether the shift lever 296 is operated to a shift range (such as the P range or the N range) where the vehicle is disabled from running or not (loop for step S804: No).

When the shift lever 296 is operated to the shift range (such as the P range or the N range) where the vehicle is disabled from running (step S804: Yes), the notification portion 110 notifies that the outer lid member 2206 is in the open state (step S806).

While the shift lever 296 is operated to the shift range (such as the P range or the N range) where the vehicle is disabled from running (loop for step S808: No), the notification portion 110 returns to the step S806 to continue the notification. When the shift lever 296 is operated to a shift range (such as the D range, the B range or the R range) where the vehicle is enabled to run (step S808: Yes), the notification portion 110 suspends the notification (step S810).

According to the electric vehicle 20 according to the embodiment as described above, when the external charger 30 is connected to the vehicle-side connector 26 while the outer lid member 2206 covering the vehicle-side connector 26 is in an open state, notification about the open state of the outer lid member 2206 is suspended. In this manner, the notification which is likely to be unnecessary for the user is suspended so that annoyance to the user can be reduced. In addition, the notification is performed under more proper conditions so that effectiveness of the notification can be enhanced advantageously.

In addition, in the electric vehicle 20, notification is suspended as soon as the running speed of the vehicle becomes equal to or higher than the predetermined speed. With this configuration (pattern 1), the notification which is likely to be unnecessary for the user is suspended so that annoyance to the user can be reduced advantageously. In addition, after the notification has been suspended once, the notification is resumed as soon as the running speed changes to a low speed, for example, due to waiting for a traffic signal etc. Thus, the notification can be easily noticed by the user advantageously.

In addition, in the electric vehicle 20, the notification method is changed between the case where the running speed of the vehicle is lower than the predetermined speed and the case where the running speed of the vehicle is equal to or higher than the predetermined speed. With this configuration (pattern 2), the contents of the notification can be more surely transmitted to the user advantageously.

In addition, in the electric vehicle 20, notification is suspended once when the vehicle starts running. In addition, the notification is resumed as soon as the running speed of the vehicle becomes equal to or higher than the predetermined speed. With this configuration (pattern 3), the notification which is likely to be unnecessary for the user is suspended so that annoyance to the user can be reduced. In addition, the notification is resumed in consideration of a case where the user is not aware of the notification prior to the start of the vehicle running. Accordingly, unexpected damage etc. on the lid member can be prevented advantageously.

In addition, in the electric vehicle 20, notification is suspended when the shift lever 296 is operated to the shift range where the vehicle is enabled to run. With this configuration (pattern 4), the notification which is likely to be unnecessary for the user can be suspended so that annoyance to the user can be reduced.

Incidentally, the embodiment has been described in the case where the vehicle according to the invention is regarded as an electric vehicle using electric power as driving energy. However, the invention is not limited thereto but may be applied to a vehicle using fuel (such as gasoline, methanol or hydrogen) as driving energy.

In addition, in the embodiment, the outer lid member 2206 corresponds to a lid member. However, the invention is not limited thereto, but may be applied to the inner lid members 2604 which cover the vehicle-side coupling faces 2602.

What is claimed is:
1. A vehicle that performs notification about an open/closed state of a lid member covering an interface for supplying driving energy, the vehicle comprising:
a notification portion that performs notification when the lid member is in the open state; and
a connection detecting portion that detects a connection state of a driving energy supply device to the interface,
the vehicle further comprising:
a speed detecting portion that detects a running speed of the vehicle, wherein the notification portion suspends notification when the driving energy supply device is connected to the interface during the open state of the lid member, and wherein the notification portion suspends notification when the detected running speed of the vehicle becomes equal to or higher than a predetermined speed during the open state of the lid member.

2. The vehicle that performs notification about an open/closed state of a lid member covering an interface for supplying driving energy, the vehicle comprising:

a notification portion that performs notification when the lid member is in the open state; and a connection detecting portion that detects a connection state of a driving energy supply device to the interface, wherein the notification portion suspends notification when the driving energy supply device is connected to the interface during the open state of the lid member, the vehicle further comprising:

a speed detecting portion that detects a running speed of the vehicle, wherein the notification portion notifies the open state of the lid member with a plurality of notification methods, and wherein the notification portion changes a current notification method to another notification method when the detected running speed of the vehicle becomes equal to or higher than a predetermined speed during the open state of the lid member.

3. The vehicle that performs notification about an open/closed state of a lid member covering an interface for supplying driving energy, the vehicle comprising:

a notification portion that performs notification when the lid member is in the open state; and a connection detecting portion that detects a connection state of a driving energy supply device to the interface, wherein the notification portion suspends notification when the driving energy supply device is connected to the interface during the open state of the lid member, the vehicle further comprising:

a speed detecting portion that detects a running speed of the vehicle, wherein the notification portion suspends notification when the vehicle starts running during the open state of the lid member, and wherein the notification portion resumes the notification when the detected running speed of the vehicle becomes equal to or higher than a predetermined speed.

4. A vehicle that performs notification about an open/closed stated of a lid member covering an interface for supplying driving energy, the vehicle comprising:

a notification portion that performs notification when the lid member is in the open state; and a connection detecting portion that detects a connection state of a driving energy supply device to the interface, wherein the notification portion suspends notification when the driving energy supply device is connected to the interface during the open state of the lid member, the vehicle further comprising:

a shift detecting portion that detects an operation state on a shift setting portion of the vehicle, wherein the notification portion suspends notification when the shift setting portion is operated to a shift range where the vehicle is enabled to run.

\* \* \* \* \*